Nov. 23, 1965  G. STAMBOL  3,219,079
SAW BLADE GUARD
Filed Nov. 13, 1963
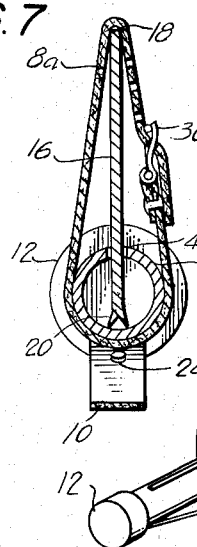
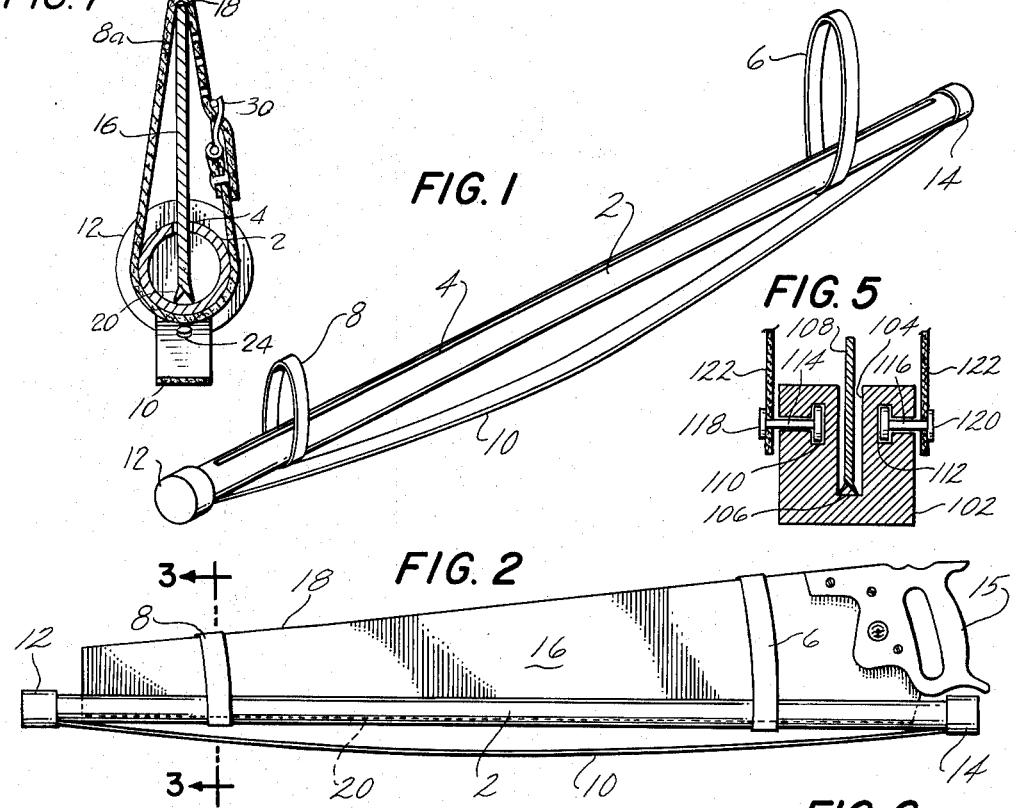
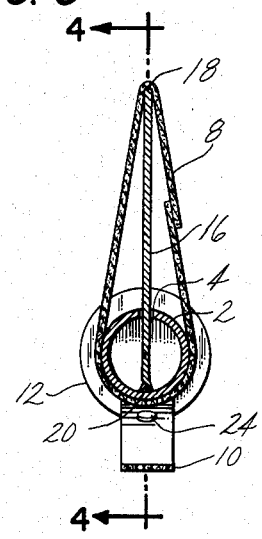
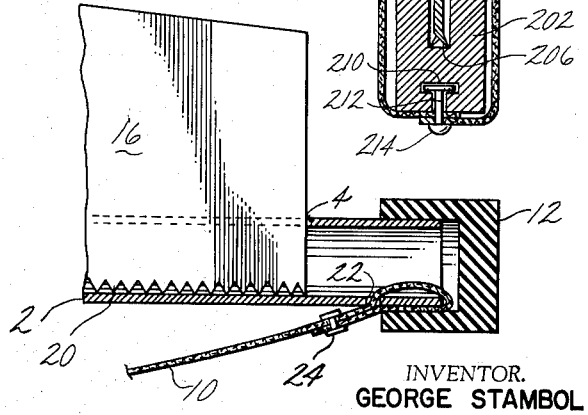
INVENTOR.
GEORGE STAMBOL
BY
ATTORNEY _United States Patent Office_

3,219,079
Patented Nov. 23, 1965

3,219,079
SAW BLADE GUARD
George Stambol, 2273 Ellington Road,
Wapping, Conn.
Filed Nov. 13, 1963, Ser. No. 323,412
7 Claims. (Cl. 145—35)

The present invention relates to tool protecting and safety devices and, more particularly, to guards for the blades of carpenter's saws.

In carrying and storing carpenter's saws which have a handle and a blade projecting therefrom with a toothed edge extending along the length of the blade, the unguarded toothed edge of the blade presents a hazard to persons and property often resulting in accidental injury or damage. Furthermore the toothed edge of the blade itself is subject to damage from accidental dropping or contact with hard surfaces which would bend, dull or otherwise damage the teeth since their efficiency requires not only relative sharpness but also proper angularity and placement.

It is an object of the present invention to provide a guard for a toothed blade edge of a carpenter's saw which may be quickly and easily placed upon and removed from the blade, and which offers substantial protection to the persons and property as well as to the blade itself.

Another object is to provide such a guard which is light in weight, durable, and readily adapted to saw blades of a variety of widths, tapers and lengths.

A further object is to provide such a guard which is relatively inexpensive and which is easily manufactured from readily available materials.

Other objects and advantages will be readily apparent from the following detailed specification and the attached drawings wherein;

FIGURE 1 is a perspective view of a saw blade guard embodying the present invention;

FIGURE 2 is a side elevational view of the guard of FIGURE 1 with a carpenter's saw positioned therein;

FIGURE 3 is a sectional view to an enlarged scale along the line 3—3 of FIGURE 2;

FIGURE 4 is a fragmentary sectional view along the line 4—4 of FIGURE 3;

FIGURE 5 is a fragmentary cross-sectional view of another embodiment of the present invention with a carpenter's saw in place and illustrating another means of securing the loop members;

FIGURE 6 is a fragmentary cross-sectional view of still another embodiment of the present invention with a carpenter's saw in place; and FIGURE 7 is a sectional view similar to FIGURE 3 showing an embodiment of the present invention employing length adjusting means.

It has now been found that the foregoing and related objects may be readily attained in a saw blade guard for a carpenter's saw having a handle and a blade tapering from a wider end adjacent the handle to a narrower free end with a toothed edge and an untoothed edge extending therealong, comprising an elongated guard member of relatively rigid material having a longitudinally extending groove or slot therein dimensioned to receive the toothed edge of the blade of a carpenter's saw. Slidably mounted on the guard member is a retaining member having a loop of flexible, relatively stretch-resistant material with relatively high tensile strength which extends outwardly from the grooved portion of the guard member and is dimensioned to extend tightly about a portion of a saw blade received in the groove. In this manner, the retaining member is slidable along the guard member and its loop is slidable over the untoothed edge of the saw blade from the narrower end toward the wider end thereof for binding frictional engagement with the tapering untoothed edge of the saw blade at a point intermediate the two ends thereof. Thus, a rapidly engageable and disengageable coupling of the saw to the guard may be obtained to ensure secure seating of the saw blade within the groove of the guard member.

Desirably, the saw blade guard includes two retaining members having loops cooperatively dimensioned so that the loop of the one will slide onto the wider portion of the saw blade for binding engagement with the tapering untoothed edge of the saw blade at the wider portion thereof adjacent the handle and the other loop will slide onto the narrower portion of the saw blade adjacent the free end for binding engagement with the tapering untoothed edge of the saw blade at the narrower portion thereof for rapidly disengageable but secure seating of the toothed edge of the blade within the guard member by engagement therebetween at two points spaced along the length of the saw blade.

Although the retaining members may be freely removable from the guard member, most desirably the saw blade guard includes means preventing the retaining members from sliding away from the guard members to prevent inadvertent dismounting therefrom and possible loss. Conveniently and economically, the guard member may be a standard piece of tubing or extrusion provided with the desired slot and the retaining members may simply be complete loops of material encircling the guard members and a band extending along the length of the guard member may be secured to both ends thereof and extend outwardly of the loops to limit the sliding movement thereof.

The loops may be provided with length adjusting means such as buckles to provide a gross adjustment for accommodating a greater variety of saw blade sizes and tapers. Thus, the loops may be adjusted to an approximate position for a given blade without any tension thereon and then slid toward the wider end of the blade for binding frictional engagement as in the case of the non-adjustable loops.

Turning now to the attached drawings, therein is shown a saw blade guard embodying the present invention having an elongated guard member 2 of relatively rigid material with a longitudinally extending groove or slot 4 therein of sufficient length and breadth to receive the toothed edge of a saw blade.

A pair of retaining members 6, 8 is simply provided by a pair of loops of flexible material which are slidably mounted upon and encircle the guard member 2, and the two loops are cooperatively dimensioned so that they will engage the tapering untoothed edge at spaced points along its length. The loop retaining members 6, 8 are held against inadvertent disengagement from the guard member 2 by an elongated band member 10 secured at either end to the ends of the guard member 2 and dimensioned to extend along the length of the guard member outwardly of the loop member. As best seen in FIGURE 4, the band member 10 is conveniently secured to the tubular guard member 2 by passing the ends of the band through the corresponding ends of the guard member 2 and through the apertures 22 adjacent the ends of guard member 2 to form small loops which are closed by the rivets 24.

Bumper members 12, 14 of resilient material such as rubber or synthetic plastic are fitted over the ends of the guard member 2 and the ends of the band member 10 to absorb shock and to protect persons and property from the ends of the guard member, and may be secured thereto by friction or other suitable means such as adhesive.

A conventional carpenter's saw having a handle 15 and a blade 16 of the type which has untoothed edge 18 tapering with respect to the toothed edge 20 from a greater width adjacent the saw handle 15 to a narrower width at the free end is conveniently guarded by slipping the toothed edge 20 into the slot 4 of the guard member 2, while passing the narrower end of the blade 16 through the loops 6, 8. The larger loop 6 is dimensioned to slide about the guard member 2 onto the wider portion of the blade 16 as the blade is being seated in the slot 4, and then is slid toward the wider end until the blade 16 is sufficiently wide to draw the loop 6 into tight, binding frictional engagement with the tapering untoothed edge 18 of the blade 16 and the guard member 2 adjacent the handle or wider end of the blade 16. After the blade has been inserted into the slot 4, the smaller loop 8 is also moved toward the wider end of the blade 16 until it frictionally binds against the tapering untoothed edge 18 of the blade 16 and the guard member 2 adjacent the narrower free end of the blade 16 for rapidly disengageable but secure seating of the saw blade within the slot 6 of the guard member 2 by frictional engagement at two points spaced along the length of the saw blade. It can be seen that the movement of the loops 6, 8 into binding engagement with the untoothed edge 18 also brings the toothed edge 20 of the blade 16 into tight frictional engagement with the surface of the guard member 2 to substantially prevent inadvertent relative sliding movement and accidental disengagement.

The guard member 2 may be quickly disengaged from the blade 16 by pushing the portions of the loops 6, 8 in binding engagement with the smooth edge 18 toward the narrower end of the blade 16. The blade 16 may then be easily withdrawn through the loops 6, 8.

As shown in FIGURES 1 and 4, the slot is dimensioned to terminate at points spaced from the ends of the guard member 2 to prevent the ends of the blade 16 from being pushed against and disengaging the bumper members 12, 14 when the blade 16 is being positioned in or removed from the guard member 2, and also to avoid undesired loss in strength in the tubing.

The guard member 2 may be conveniently and readily fabricated from aluminum tubing which, with a groove machined through the wall thereof, provides sufficient rigidity and strength to protect the blade from impact and is soft enough so as not to dull the teeth when drawn tightly against the toothed edge of the blade. Aluminum tubing of about 0.75 inch outer diameter having a wall thickness of about 49 mils has been found particularly adaptable to this use, being light in weight, easily machined, and relatively inexpensive. Alternatively a dowel of wood with a groove therein may be used as the guard member, but is subject to excessive wear at the line of contact with the toothed edge. Plastic tubing may also be used if so desired, and nylon, and high density polyethylene and polypropylene are generally suitable materials.

The length of the groove must be sufficient to allow some sliding of the blade into and out of engagement with the guard member. For the most common carpenter's saw, a groove 28 inches long and ⅛ inch wide is satisfactory, but the length and width may be readily increased with some increase in the body of the guard member 2 to accommodate a still wider variety of sizes.

Turning now to FIGURE 5, therein is illustrated in cross-section an alternative embodiment of the present invention wherein a guard member 102 is provided with a longitudinally extending saw blade receiving slot 104 within which is received the toothed edge 106 of the saw blade 108 and longitudinally extending generally T-shaped slider slots 110, 112 disposed to opposite sides of the groove 104. Headed slide members 114, 116, seat within the slider slots 110, 112 and readily traverse therein. The guard member is conveniently extruded with the desired slots extending along the length of the extrusion from suitable material such as aluminum or synthetic plastics.

The outer ends of the shanks of the slide members 114, 116 are provided with axial threaded apertures (not shown) within which the threaded fasteners 118, 120 are tightly received to firmly but detachably anchor the ends of a strap 122 forming a loop 122 to engage the blade 108 and permit replacement after wear or rupture.

To prevent the slide members 114, 116 from sliding out of the slider slots 110, 112, the ends of the guard member 102 may be provided with bumpers (not shown) similar to those of FIGURES 1–4; or the ends of the slots 110, 112 may be provided with abutment elements (not shown) or they may be peened closed or otherwise plugged.

Referring now to FIGURE 6, a further embodiment is therein illustrated as having a guard member 202 which may be extruded readily from relatively rigid material such as aluminum or synthetic plastic. The guard member 202 is provided with a blade receiving slot 204 within which is received the toothed edge 206 of a sawblade 208 and a single generally T-shaped slider slot 210 in the opposite edge or surface thereof. A slide member 212 slidably traverses in the slider slot 210 and is provided with a threaded aperture (not shown) in the shank thereof for receiving the threaded fastener 214 for detachably mounting both ends of a strap 216 to form a loop. The sliding member 212 and fastener 214 are not tensioned when the loop 216 is in binding engagement with the saw blade 208 and guard member 202, and may be secured together by snap means or adhesive as well as threaded means. To prevent the sliding member 212 from sliding out of the slot 210, means similar to those suggested for the embodiment of FIGURE 5 may be employed.

As seen in the illustrated embodiments, the retaining members must provide a loop of flexible material extending outwardly of the slotted portion of the guard member. They may be entirely provided by a loop as in FIGURES 1–4, or they may be straps secured to a slide member to provide the desired loop.

Referring now to the embodiment of FIGURE 7, the retaining member 8a of flexible material has a buckle 30 at one end thereof which adjustably receives and retains the other end thereof. In this manner the effective length of the loop provided by the retaining member 8a may be varied so as to provide a gross adjustment to accommodate a greater variety of saw blade sizes and tapers.

The loops are flexible and must have relatively high tensile strength. For rapid and effective engagement, they must be relatively stretch-resistant in order to develop the high tensile stresses needed for binding frictional engagement with relatively slight elongation in order to utilize the gentle taper characteristic of most carpenter's saws. Straps of leather and synthetic plastic materials such as nylon and polypropylene are well adapted to this use. In practice nylon straps ⅜ inch in width and ¹⁄₁₆ inch in thickness have been found particularly well suited for this purpose. Easily stretchable materials such as rubber are largely unsatisfactory for this purpose unless of sufficiently heavy stock to develop the required high tensile force with relatively small longitudinal strain.

The band member, the embodiment of FIGURES 1–4, is conveniently made of leather or synthetic plastic material. A nylon band ⅛ inch in width and ¹⁄₁₆ inch in thickness has proven particularly satisfactory for this purpose. Desirably the band is sufficiently slack to be used as a convenient handle for carrying the blade guard with the saw secured thereto.

Thus, it can be seen from the foregoing detailed specification and the attached drawings that the present invention provides a guard for the toothed blade edge of a carpenter's saw which may be quickly and easily applied and removed. The guard provides effective protection to persons and property and is sufficiently rigid and strong to protect the blade and teeth from damage. The blade guard is light in weight, extremely simple in construction, durable, and it may be economically and conveniently manufactured from readily available material to accommodate a large variety of sizes of saws.

Having thus described the invention I claim:

1. A saw blade guard for a carpenter's saw having a handle and a blade tapering from a wider end adjacent the handle to a narrower free end with a toothed edge and an untoothed edge extending therealong, said guard comprising an elongated guard member of relatively rigid material having a longitudinally extending slot therein dimensioned to receive the toothed edge of the blade of an associated carpenter's saw; and a retaining member providing a loop of flexible, relatively stretch-resistant material having relatively high tensile strength extending outwardly from the slotted portion of said guard member and dimensioned to extend tightly about a portion of the blade of an associated carpenter's saw received in said slot, said retaining member being slidably mounted upon said guard member for sliding movement therealong and for sliding movement of said loop over the untoothed edge of the associated saw blade from the narrower end toward the wider end thereof for binding frictional engagement with the tapering untoothed edge of the saw blade at a point intermediate the ends thereof to provide a rapidly disengageable but secure seating of the saw blade within said slot of said guard member.

2. The saw blade guard of claim 1 wherein said guard member provides means limiting the sliding movement of said retaining member to prevent inadvertent discounting therefrom.

3. The saw blade guard of claim 1 wherein said retaining member is provided with length adjusting means for said loop to permit gross adjustment and accommodation of a greater variety of saw blade sizes.

4. A saw blade guard for a carpenter's saw having a handle and a blade tapering from a wider end adjacent the handle to a narrower free end with a toothed edge and an untoothed edge extending therealong, said guard comprising an elongated guard member of relatively rigid material having a longitudinally extending slot therein dimensioned to receive the toothed edge of the blade of an associated carpenter's saw; two loop members of flexible, relatively stretch-resistant material having relatively high tensile strength encircling said guard member and extending outwardly from the slotted portion thereof and dimensioned to extend tightly about a portion of the blade of an associated carpenter's saw received in said slot, said loop members being slidably mounted upon said guard member, one of said loop members being dimensioned for sliding onto the wider portion of the blade of an associated saw for binding frictional engagement with said guard member and the tapering untoothed edge of the saw blade at the wider portion thereof, the other of said loop members being dimensioned for sliding onto the narrower portion of the saw blade for binding frictional engagement with said guard member and the tapering untoothed edge of the saw blade at the narrower portion thereof to provide rapidly disengageable but secure seating of the saw blade within said slot of said guard member at two points spaced along the length of the saw blade; and means limiting the sliding movements of said loop members on said guard member to prevent inadvertent dismounting therefrom.

5. The saw blade guard of claim 4 wherein said limiting means includes a band member secured at the ends thereof to the ends of said guard member and extending along the length of said guard member outwardly of the loop members.

6. A saw blade guard for a carpenter's saw having a handle and a blade tapering from a wider end adjacent the handle to a narrower free end with a toothed edge and an untoothed edge extending therealong, said guard comprising an elongated guard member of relatively rigid material having a longitudinally extending slot therein dimensioned to receive the toothed edge of the blade of an associated carpenter's saw, a pair of longitudinally extending slider slots disposed about said groove; two pairs of slide members slidably seated in said pair of slider slots; two loop members of flexible relatively stretch-resistant material having relatively high tensile strength and dimensioned to provide a loop extending outwardly from the slotted portion to extend over a portion of the blade of an associated carpenter's saw received in said slot secured to said slide members for sliding movement along the blade, one of said loop members being dimensitioned for sliding on to the wider portion of the blade of an associated saw for biniding engagement with said guard member and the tapering untoothed edge of the saw blade at the wider portion thereof, the other of said loop members being dimensioned for sliding onto the narrower portion of the saw blade for binding engagement with said guard member and the tapering untoothed edge of the saw blade at the narrower portion thereof for rapidly disengageable but secure seating of the saw blade within said slot of said guard member.

7. A saw blade guard for a carpenter's saw having a handle and a blade tapering from a wider end adjacent the handle to a narrower free end with a toothed edge and an untoothed edge extending therealong, said guard comprising an elongated guard member of relatively rigid material having a longitudinally extending slot therein dimensioned to receive the toothed edge of the blade of an associated carpenter's saw and a longitudinally extending slider slot therein spaced about the periphery from said first mentioned slot; two slide members slidably mounted in said slider slot; two loop members of flexible, relatively stretch-resistant material having relatively high tensile strength and dimensioned to fit over said guard member and a portion of the blade of an associated carpenter's saw received in said groove, said loop member being detachably secured to said sliding members, one of said loop members being dimensioned for sliding onto the wider portion of the blade of an associated saw for binding engagement with said guard member and the tapering untoothed edge of the saw blade at the wider portion thereof, the other of said loop members being dimensioned for sliding onto the narrower portion of the saw blade for binding engagement with said guard member and the tapering untoothed edge of the saw blade at the narrower portion thereof to provide a rapidly disengageable but secure seating of the saw blade within said slot of said guard member.

References Cited by the Examiner

UNITED STATES PATENTS

| | | |
|---|---|---|
| 1,544,770 | 7/1925 | Nathan. |
| 2,792,038 | 5/1957 | Riccitelli. |

FOREIGN PATENTS

| | | |
|---|---|---|
| 492,247 | 3/1954 | Italy. |

WILLIAM FELDMAN, *Primary Examiner.*